Patented Nov. 15, 1949

2,487,785

UNITED STATES PATENT OFFICE 2,487,785

PROCESS FOR THE PRODUCTION OF GLUTAMIC ACID

Morris J. Blish, Toledo, Ohio, assignor to International Minerals & Chemical Corporation, a corporation of New York No Drawing. Application August 25, 1948, Serial No. 46,173

13 Claims. (Cl. 260—527)

This invention relates to a process for the recovery of glutamic acid from raw materials containing glutamic acid or glutamic acid mother substances. More particularly, the invention relates to the recovery of glutamic acid from Steffen's filtrate or similar end liquors from sugar beet refineries.

Glutamic acid has been produced by the hydrolysis of animal or vegetable proteins by employing either acidic or alkaline hydrolysis, and also from solutions resulting from the desugarization of sugar beet solutions by a method known in the sugar industry as the Steffen process. Glutamic acid is widely employed in the food industry as mono-sodium glutamate, which is used in many food products to enhance the flavor thereof. Glutamic acid is also used in the pharmaceutical industry and is a component of protein hydrolysates which may be either orally or parenterally administered. Strictly speaking, glutamic acid which is produced by the acid hydrolysis or proteinaceous substances and by the acidic or alkaline hydrolysis of sugar beet end liquors is chemically known as L(+)-glutamic acid. However, L(+)-glutamic acid is now universally designated in the food and drug industries merely as "glutamic acid," and the latter expression will be employed herein as well as in the appended claims.

The partially desugarized solution which results from the Steffen process is known in the sugar industry as Steffen's filtrate and consists of a dilute aqueous solution containing about 95% by weight of water and about 5% by weight of a complex mixture of organic and inorganic compounds. The inorganic compounds consist mainly of salts of sodium, potassium, and calcium; while the organic compounds include glutamic acid, glutamic acid mother substances, betaine, and minor amounts of other amino acids. Numerous processes are familiar to those skilled in the art whereby glutamic acid may be recovered from Steffen's filtrate; among which may be mentioned subjecting Steffen's filtrate to hydrolysis under either acidic or alkaline conditions while employing such hydrolytic reagents as sulfuric acid, hydrochloric acid, caustic soda, lime, and similar reagents. Among the methods which are available may be listed those described in patents issued to Tressler, Nos. 1,634,221 and 1,634,222; Takayama, No. 1,681,379; and Tressler No. 1,685,758. These processes involve a preliminary concentration of so-called "thin" Steffen's filtrate (95% water) until the solution has a specific gravity of between about 1.2 and about 1.4. The preferable practice is to achieve a preliminary removal of betaine by the addition of either hydrochloric or sulfuric acids and crystallizing the appropriate betaine salt from the acidified liquor. The removal of betaine salts is followed by heating the resultant acidic liquor in order to liberate glutamic acid from glutamic acid mother substances. Glutamic acid is recovered from the hydrolysate by adjusting the pH of said hydrolysate to about 3.2 which is the isoelectric point of glutamic acid. The desired product then crystallizes from the adjusted hydrolysate upon prolonged standing and is recovered therefrom.

Several alternative processes involve a preliminary removal of potash salts from concentrated Steffen's filtrate by adding concentrated sulfuric acid thereto, filtering the resulting solutions, and hydrolyzing the glutamic acid mother substances contained in the residual liquors in order to produce the desired glutamic acid.

Among the processes which are available for the removal of glutamic acid from alkali-hydrolyzed Steffen's filtrate may be mentioned those described in the patent issued to Masuda et al., No. 1,947,563, and to Manning, No. 2,405,-223. These processes involve the hydrolysis of concentrated Steffen's filtrate with an inorganic alkaline reagent such as sodium hydroxide under controlled conditions. The hydrolysate is adjusted with mineral acids to give a pH of about 3.2, and glutamic acid is recovered from the adjusted hydrolysate. A patent issued to Royal, No. 2,373,-342, teaches a process whereby dilute or "thin" Steffen's filtrate is subjected to alkaline hydrolysis employing an inorganic alkaline reagent such as lime or sodium hydroxide, and glutamic acid is recovered from the alkaline hydrolysate in accordance with the method described above.

It has also been proposed to recover glutamic acid from Steffen's filtrate which has been heated or hydrolyzed under alkaline conditions by subjecting the hydrolysate to the action of a cation exchange resin. This process has been described in a patent issued to Nees and Bennett, No. 2,375,-165. In accordance with this process, glutamic acid and other amino acids as well as betaine are adsorbed on a cation exchange resin and are later desorbed by the accumulation of alkaline metal ions on the cation resin which are adsorbed in preference to glutamic acid. Such a process achieves an appreciable concentration of the desired glutamic acid.

Previous processes which have been employed to produce glutamic acid from Steffen's filtrate by means of an alkaline hydrolysis result in the formation of certain impurities, essentially organic in nature, which remain or become insoluble or colloidal in nature during the neutralization of the alkaline hydrolysate to low pH values. These impurities are soluble in alkaline solutions, but have a tendency to precipitate from the hydrolysate at acidic pH values and become particularly insoluble at pH values which are employed for purposes of crystallizing glutamic acid from the hydrolysate; namely, at a pH of about 3.2. The precipitation of such impurities results in the contamination and discoloration of the desired glutamic acid crystals and also seriously interferes with the filtration and crystallization of the glutamic acid crystals from liquors containing the same. In order to prepare glutamic acid or solutions thereof of a sufficient purity to render them acceptable to the food or pharmaceutical trade, it has been necessary to further treat the crude glutamic acid crystals or solutions thereof with suitable quantities (usually quite large quantities) of activated carbon or charcoal. The latter decolorizing agents are employed to remove substantially all of the aforementioned objectional impurities. This decolorizing process is usually accomplished by dissolving crude glutamic acid in an aqueous alkaline solution—for example, dilute sodium hydroxide solution—thereby forming a solution of the sodium salt of glutamic acid. The resulting solution is then decolorized with activated carbon in order to remove substantially all of the objectionable impurities from the solution. Subsequent acidification of the resulting solution produces glutamic acid crystals of improved purity. Alternatively, the crude glutamic acid or solutions thereof may be subjected to a series of recrystallizations from water, organic solvents, or mixtures thereof; but such processes are usually economically prohibitive. The contamination of glutamic acid by the heretofore mentioned impurities in the crystallizing tanks is particularly aggravated by a recycling operation which is usually employed in processes involving glutamic acid recovery from Steffen's filtrate whereby mother liquor from glutamic acid crystals is recycled to the evaporators, thereby resulting in an increase in the concentration of impurities in the glutamic acid-producing liquors.

It is an object of the invention to provide an improved process for the recovery of glutamic acid from Steffen's filtrate and analogous liquors from the beet sugar industry.

It is a further object of the invention to provide an improved process whereby objectionable impurities inherently present in alkali-hydrolyzed Steffen's filtrate may be removed therefrom.

It is a further object of the invention to provide an improved process for the purification of glutamic acid crystals or salts thereof, said glutamic acid having been produced by hydrolyzing Steffen's filtrate under alkaline conditions.

It is a further object of the invention to provide an improved process for the purification of glutamic acid obtained from alkali-hydrolyzed Steffen's filtrate whereby the amount of decolorizing agents normally required in such operations is substantially reduced.

It is a further object of the invention to provide an improved process for the recovery of glutamic acid from alkali-hydrolyzed Steffen's filtrate whereby the filtration of glutamic acid-containing liquors and the crystallization of glutamic acid crystals from hydrolysates containing the same are markedly improved.

The above objects, as well as others which will become apparent upon a more complete understanding of the invention which is hereinafter described, are achieved by preparing a solution selected from the group consisting of a solution containing alkali lignin in admixture with glutamic acid which has been prepared by the alkaline hydrolysis of Steffen's filtrate and a solution containing Steffen's filtrate in admixture with alkali lignin, said admixture having been subjected to alkaline hydrolysis. The impurities present in the alkaline hydrolysate precipitate from the hydrolysate under suitable conditions which are hereinafter described. The presence of alkali lignin in the Steffen's filtrate, either during or subsequent to hydrolysis, causes these impurities to precipitate, thereby rendering them more amenable to operations for their removal; for example, by filtration, centrifugation, etc.

It has been previously proposed to employ various types of lignin which have been recovered from lignin-cellulose compositions, either by extraction with alkali metal hydroxides or by extraction with sulfites or bisulfites, for the purification or clarification of liquids which contain colloidal or suspended matter. It has been found that when Steffen's filtrate is treated with such lignin materials prior to subjecting Steffen's filtrate to alkaline hydrolysis, the beneficial results claimed by such teachings are insignificant and the removal of the objectionable impurities from the alkaline hydrolysate is only partially attained. It has been found that the objectionable impurities heretofore mentioned are nevertheless produced during an alkaline hydrolysis of Steffen's filtrate and similar glutamic acid-producing liquors which have been treated with alkali lignin prior to hydrolysis. Treatment of the hydrolysate with alkali lignin either during or subsequent to such hydrolysis, in accordance with the instant novel process, successfully achieves the removal of substantially all of the colored colloidal impurities produced during hydrolysis, thereby resulting in the production of a glutamic acid, from alkali-hydrolyzed Steffen's filtrate, having a purity which has heretofore been impossible to achieve.

By the term "alkali lignin" is meant lignin which is recovered from lignin-cellulose compositions—for example, either hard or soft woods, bagasse, corn stalks, and similar products—by digesting the same with dilute solutions of alkali metal or alkaline earth metal hydroxides, oxides, carbonates, or bicarbonates; for example, dilute aqueous sodium or potassium hydroxide. Such solutions extract the lignin from lignin-cellulose compositions, thereby forming alkali metal compounds of lignin which are water soluble. Lignin may be recovered from such alkaline solutions by adding thereto suitable acidic reagents; for example, mineral acids such as sulfuric or hydrochloric, or organic acids such as acetic or formic. In many instances it has been found convenient to employ for this purpose waste flue gases which contain substantial amounts of carbon dioxide. The latter reagent reduces the pH of the alkali lignin solutions to below 7.0, thereby causing precipitation of the lignin in a more or less pure state. The term "alkali lignin" as employed herein and in the appended claims is deemed to include lignin products in their substantially neutral form or in the form of alkali metal salts or alkaline earth metal salts; for example, sodium, potassium, calcium, and magnesium salts of alkali-extracted lignins. The term "alkali lignin" is not deemed to include lignin which may be produced by the so-called sulfate or Kraft process wherein lignin-cellulose materials are extracted when alkaline solutions containing various sulfur-containing compounds such as alkali metal sulfites, bisulfites, thiosulfates, etc. Such extracts are known in the trade as sulfate and sulfite lignins, respectively, and these lignins are recovered from their solutions by precipitation with acids as hereinbefore described. The latter types of lignin are not suitable for the production of improved grades of glutamic acid from alkali-hydrolyzed Steffen's filtrate in accordance with the instant novel process.

The alkali lignin which is employed for the improved recovery of glutamic acid from alkali-hydrolyzed Steffen's filtrate in accordance with the instant novel process may be employed as a solution thereof by dissolving the same in an aqueous solution of alkali metal hydroxide or alkaline earth metal hydroxide. Such solutions may be prepared by dissolving alkali lignin in a dilute solution of such reagents; for example, in a dilute aqueous solution of sodium hydroxide. Preferably, the resulting solutions should have a pH of between about 9.0 and about 11.0. Alternatively, alkali lignin or a suspension thereof in water may be added to alkali-hydrolyzed Steffen's filtrate while the later is still highly alkaline, thereby achieving solution of the lignin in such solutions. In still another alternate procedure, alkali lignin may be added to Steffen's filtrate either prior to or subsequent to alkaline hydrolysis, and may be precipitated from such solutions by adjusting the pH thereof to suitable values which will be hereinafter fully described, thereby causing a beneficial conditioning effect upon the insoluble impurities heretofore described. The alkali lignin employed in the instant novel process may be either a crude alkali lignin such as may be obtained by directly acidifying alkali-lignin "digest" (for example, soda black liquors) or a somewhat purified alkali lignin which has been reprecipitated by acidification of an alkaline solution of crude alkali lignin, said precipitated lignin being then subjected to further purification treatment; for example, by leaching with organic solvents.

It has been found that the previously described impurities which are present in alkali-hydrolyzed Steffen's filtrate or in glutamic acid crystals which have been recovered from Steffen's filtrate which has been hydrolyzed under alkaline conditions in accordance with methods which are known in the art may be substantially removed by precipitating said impurities with the aid of a small amount of alkali lignin. At present, the nature or character of these impurities is somewhat obscure, but it has been found that the presence of alkali lignin in glutamic acid liquors containing these impurities has a decidedly advantageous effect in that this substance conditions these impurities and causes their precipitation in such a manner that they may be readily removed from the glutamic acid liquor by filtration, centrifugation, or other appropriate methods. This results in the formation of glutamic acid-containing liquors which, when concentrated to a suitable solids content and adjusted to an appropriate pH value, produce a glutamic acid of much higher purity and lighter color than has heretofore been produced from alkali-hydrolyzed Steffen's filtrate.

The removal of the aforementioned impurities by means of alkali lignin also results in an appreciable decrease in viscosity of the glutamic acid liquors and also in the more rapid crystallization of glutamic acid therefrom. These beneficial effects are realized only in a minor degree by treating Steffen's filtrate with alkali lignin prior to alkaline hydrolysis.

The amount of alkali lignin which is required for the removal of colored colloidal impurities from Steffen's filtrate which has been subjected to alkaline hydrolysis, or from solutions containing glutamic acid which has been produced by means of an alkaline hydrolysis of Steffen's filtrate, may be varied through a rather broad range. By the term "small amount of alkali lignin," as employed herein and in the appended claims, is meant an amount not greater than about 10% by weight of alkali lignin based upon the weight of Steffen's filtrate or concentrated Steffen's filtrate or glutamic acid-containing solution so treated. Usually an amount between about 0.03 and about 5.0% by weight of said lignin, based upon the weight of the solution employed, will be adequate for the treatment of any Steffen's filtrate which is produced in the beet sugar industry.

Alkali lignin may be added to alkali-hydrolyzed Steffen's filtrate, or to solutions of glutamic acid which has been obtained from alkali-hydrolyzed Steffen's filtrate, in the previously mentioned amounts either in a solid form or in the form of aqueous or alkaline aqueous solutions or suspended therein as previously described herein.

The removal of the colored colloidal impurities from Steffen's filtrate which has been subjected to hydrolysis under alkaline condiitons, or from solutions containing glutamic acid which has been produced from alkali-hydrolyzed Steffen's filtrate, may be conducted under acidic, neutral, or basic conditions. However, it has been found that a pH value below about 7.0, and preferably between about 5.0 and about 7.0, is most efficient for the removal of these impurities. At pH values above about 7.0, alkali lignin is less effective for its intended purpose, but the process is nevertheless operable outside of this particular pH range; i. e., below about 7.0.

The precipitation of insoluble impurities from alkali-hydrolyzed Steffen's filtrate or from solutions containing glutamic acid which has been produced by an alkaline hydrolysis of Steffen's filtrate is most efficiently conducted at a temperature of between about 20° and about 35° C. However, precipitation at higher or lower temperatures—for example, at temperatures up to about 75° C.—also produces liquors which produce a glutamic acid of greater purity than has heretofore been achieved, but somewhat smaller amounts of colloidal or insoluble impurities are removed at the higher temperature levels. Obviously, temperatures below 20° C. may also be employed, the temperature being limited only by the increase in viscosity of glutamic acid liquor which may cease to flow efficiently during filtration.

The time of contact of alkali lignin with the insoluble impurities contained in the aforementioned glutamic acid-containing liquors may be varied through a fairly wide range; for example, between about 5 minutes and about 24 hours. A contact time of between about ¼ and about 24 hours is usually sufficient to achieve a maximum precipitation of the impurities when employing about 0.5% by weight of alkali lignin based upon the weight of Steffen's filtrate.

Alkali lignin may be employed to precipitate the colored colloidal impurities which are present in alkali-hydrolyzed Steffen's filtrate by treating the latter either in a dilute form (about 90% water) or in a more concentrated form; for example, a solution containing between about 20 and about 60% by weight of solids. A solids concentration of between about 40 and about 50% by weight during the precipitation or filtration of the insoluble impurities is quite suitable. It has been found that when the solids content of glutamic acid-containing liquor exceeds 55 to 60%, the precipitation of the objectionable impurities is not readily accomplished, probably due to the increased viscosity of solutions containing a higher solids content.

Alkali lignin in the aforementioned concentrations may be added to dilute or concentrated Steffen's filtrate either prior to hydrolysis under alkaline conditions, subsequent to hydrolysis, or to the glutamic acid-containing liquor which results from the neutralization or acidification of alkali-hydrolyzed Steffen's filtrate. Since it is desirable to precipitate the insoluble impurities from such hydrolysates while avoiding the contamination of glutamic acid crystals which will be subsequently crystallized, it is preferred to conduct the precipitation of the impurities in such a manner as to avoid conditions which are conducive to the precipitation or crystallization of substantial amounts of glutamic acid. Since the isoelectric point of glutamic acid is at a pH of about 3.2, precipitation of the insoluble impurities with alkali lignin should be conducted at pH values sufficiently removed from about 3.2 in order to avoid co-precipitation or crystallization of glutamic acid with the impurities. It is therefore advantageous to precipitate the impurities with alkali lignin at pH values above about 4.0 or below about 2.0. As previously mentioned herein, the pH at which such impurities are removed is below about 7.0, preferably between about 5.0 and about 7.0.

Not only is alkali lignin an efficient reagent for the precipitation of colored colloidal impurities which are present in alkali-hydrolyzed Steffen's filtrate, but it may also be employed in the treatment of solutions of glutamic acid which has been produced and recovered from alkali-hydrolyzed Steffen's filtrate in accordance with well known procedures previously herein described. This modification of the instant novel process will be subsequently illustrated herein.

In a preferred embodiment of the invention, Steffen's filtrate is concentrated to a specific gravity of between about 1.2 and about 1.4. To the concentrated solution is added a small amount of alkali lignin or alkali lignin-containing composition, preferably in an amount between about 0.03 and about 5.0% by weight of lignin based upon the amount of concentrated Steffen's filtrate employed in the process. To this mixture is added a basic inorganic oxygen-containing compound in an amount not greater than about 10% by weight of concentrated Steffen's filtrate. The resulting mixture is heated for a sufficient length of time at a temperature not greater than 90° C., in order to effect the production of glutamic acid from glutamic acid mother substances. The resulting solution is adjusted to a pH value of between about 5.0 and about 7.0 with an acidic material which is non-oxidizing under the conditions obtaining; for example, concentrated hydrochloric acid. The resulting solution is allowed to stand for a suitable length of time—for example, between about 24 hours—in order to permit the precipitation of the insoluble impurities which are formed during the alkaline hydrolysis. These impurities are removed from the solution by means of filtration or contrifugation and, after concentration of the resulting liquid and filtration to remove inorganic salts, the pH of the resulting filtrate is adjusted to about 3.2 by means of an acidic material such as previously described, and glutamic acid is allowed to crystallize from the adjusted solution.

In a further embodiment of the invention, concentrated Steffen's filtrate is subjected to alkaline hydrolysis as described above, but the alkali lignin is added to the hydrolysate subsequent to hydrolysis instead of prior thereto. The amount of alkali lignin added to the hydrolysate may be the same as described above, and said addition is followed by the adjustment of the pH of the resulting mixture in a similar fashion. The separation of the insoluble impurities and the recovery of glutamic acid from the resulting solution are also carried out as set forth in the previously described embodiment of the invention.

In still a further embodiment of the invention, an alkali-hydrolyzed Steffen's filtrate is prepared as previously described and the pH of the resulting hydrolysate is adjusted to between about 5.0 and about 7.0 with concentrated hydrochloric acid. To the adjusted hydrolysate is added a small quantity of alkali lignin, preferably in the form of an alkaline solution thereof in an amount between about 0.03 and about 5.0% by weight based upon the weight of Steffen's filtrate employed in the process. The resulting solution is permitted to stand for a suitable period of time—for example, between about ¼ and about 24 hours—in order to permit precipitation of the colored colloidal impurities from the hydrolysate. The subsequent steps involving removal of the insoluble precipitate, crystallization of inorganic salts, and recovery of glutamic acid are similar to the above described procedures.

It is permissible to employ either organic or inorganic acids—for example, sulfuric, hydrochloric, or acetic acids or mixtures thereof—in order to effect the adjustment of the pH of an alkaline Steffen's filtrate hydrolysate to a value which affords efficient removal of the impurities by the alkali lignin, preferably at a pH value between about 5.0 and about 7.0. Either concentrated or dilute acids may be employed for pH adjustments in any step in the process herein described. The dilute character of the solutions at the point of pH adjustment will prevent oxidation by strong oxidizing acids such as concentrated sulfuric or nitric acids. It is also possible to employ an acid hydrolysate of Steffen's filtrate for pH adjustment, such a hydrolysis having been prepared in accordance with the well-known procedures previously mentioned herein. For example, concentrated Steffen's filtrate may be heated with concentrated hydrochloric acid of about 25 to 34% HCl at about 105° C. for about 1 to 4 hours. The resulting insoluble impurities may or may not be removed from the hydrolysate by filtration, and the acidic glutamic acid-containing solution is used to neutralize the previously described alkaline Steffen's filtrate hydrolysates. The efficiency of alkali lignin as a precipitant for the insoluble impurities produced in an alkaline hydrolysis of Steffen's filtrate is not in the least impaired thereby. This particular process results in the formation of a liquor having a high concentration of glutamic acid, due to the fact that smaller quantities of inorganic reagents per unit of glutamic acid are required to neutralize or acidify the alkaline hydrolysate. The precipitation and removal of the colored colloidal impurities from the combined hydrolysates and recovery of glutamic acid from the resulting solution are conducted in accordance with the procedures previously described. When employing this particular modification of the invention, the alkali lignin may be present either during the alkaline hydrolysis of Steffen's filtrate, during the acid hydrolysis of Steffen's filtrate, or it may be added to either or both hydrolysates subsequent to the hydrolysis step. Alternatively, the alkali lignin may be added to the hydrolysates subsequent to their combination at any desired pH value. Any of these procedures will bring about an efficient removal of the organic impurities, preferably at a pH below about 7.0.

In still a further embodiment of the invention, glutamic acid which has been prepared by an alkaline hydrolysis of Steffen's filtrate and recovered from the hydrolysate in accordance with the procedures previously described herein, may be dissolved in an aqueous solution which contains a deficient quantity of at least one inorganic basic oxygen-containing compound. By the term "deficient quantity" is meant slightly less than one equivalent of said basic compound per mol of glutamic acid, or any lesser amount of said compound which will be sufficient to produce a glutamic acid salt solution. The addition of alkali lignin to such a solution, at a pH value below about 7.0, results in the precipitation of the insoluble impurities which are inherently present in glutamic acid which has been recovered by crystallization procedures from alkali-hydrolyzed Steffen's filtrate. In this particular modification of the instant novel process, the aforementioned amounts of alkali lignin are also sufficient; namely, between about 0.03 and about 5.0% by weight based upon the weight of the glutamic acid-containing solution. The preciptation of the impurities, removal thereof, and recovery of glutamic acid crystals from the clarified solution, is similar to the method previously described herein for the removal of glutamic acid from Steffen's filtrate hydrolysates.

Among the reagents which are applicable for the alkaline hydrolysis of Steffen's filtrate and which can be classified within the term "basic inorganic oxygen-containing compound" are the oxides, hydroxides, and carbonates of such metals as sodium, potassium and calcium, as well as ammonium hydroxide and equivalents thereof. Usually the amount of such reagents present during the hydrolysis is not in excess of about 10% by weight based upon the amount of Steffen's filtrate employed in the process.

Subsequent to the removal of the colored colloidal impurities which are formed during the alkaline hydrolysis of Steffen's filtrate, or subsequent to their removal from solutions containing glutamic acid which has been recovered from alkali-hydrolyzed Steffen's filtrate, it is advantageous to evaporate the clarified solution to a point beyond which incipient crystallization of salts occurs, usually to about 90% or less of the weight of the original Steffen's filtrate. This achieves the concentration of inorganic salts in the glutamic acid liquor, and such salts are preferably removed from the hydrolysate prior to crystallization of glutamic acid therefrom, thereby substantially reducing contamination of glutamic acid crystals with salt crystals where glutamic acid is crystallized from the hydrolysate at a pH of about 3.2. Following the crystallization and separation of these inorganic salt impurities, the resulting solution is acidified to a pH of about 3.2 by means of organic or inorganic acids of the type previously described for the preliminary pH adjustment of alkaline Steffen's filtrate hydrolysates. Here again, the use of an acid-hydrolyzed Steffen's filtrate is sometimes advantageous for the reasons previously herein set forth.

Glutamic acid may also be recovered from Steffen's filtrate which has been hydrolyzed under alkaline conditions by subjecting the resulting hydrolysate to the action of a cation exchange resin. Such a process is preferably conducted by first adjusting the pH of the alkaline liquor approximately to neutrality by carbonation with $CO_2$ or alkali metal carbonates or bicarbonates, removing the resulting precipitated metal carbonate by filtration, and passing the filtrate through a body of cation exchange resin. Glutamic acid and several other nitrogenous compounds which are present in the hydrolysate are adsorbed on the resin and are subsequently desorbed by eluting the resin with inorganic salts, ammonia, or mineral acids. While this operation results in a desirable concentration of glutamic acid, the process is somewhat hampered in that the colored colloidal impurities present in an alkali-hydrolyzed Steffen's filtrate are also adsorbed on the cation exchange resin, thereby rendering it less efficient for the purpose intended. It has been proposed to regenerate the contaminated resins by treatment with dilute acid; for example, sulfuric acid. It has been observed that acid treatment of most cation exchange resins does not remove sufficiently large amounts of the contaminating impurities, thereby resulting in a progressively decreased efficiency of cation exchange resin in such a process. Therefore, if the alkali-hydrolyzed Steffen's filtrate is first subjected to the action of alkali lignin, in accordance with the instant novel process, and the resulting insoluble precipitate is moved from the solution, the ion exchange process for the recovery of glutamic acid from Steffen's filtrate is thereby rendered much more efficient and economically attractive. Furthermore, the amount of acid which is required to reactivate or regenerate the cation exchange resin is substantially reduced, thereby decreasing the cost of such a process.

It is not intended to limit the invention only to the alkali lignin treatment of glutamic acid solutions which have been produced by alkaline hydrolysis of Steffen's filtrate; but the use of other agents such as diatomaceous clays (bentonite, for example) and similar materials, either during treatment with alkali lignin or at other points in the clarification process, is also contemplated.

In order to more fully illustrate the nature and character of the invention, but with no intention of being limited thereby, the following examples are set forth:

Example I

About 500 grams of concentrated Steffen's filtrate (specific gravity of about 1.32) was hydrolyzed by heating with about 8% by weight of sodium hydroxide. Hydrolysis was continued for about 2¼ hours at a temperature between about 80° and about 90° C. The hydrolysate was cooled to about room temperature and a sufficient amount of hydrochloric acid (about 34% HCl) was added thereto in order to reduce the pH of the hydrolysate to between about 5.5 and about 6.0. The resulting solution was then filtered, and the filtrate evaporated to about 90% of the weight of the original Steffen's filtrate. At this particular solids content, crystallization of inorganic salts occurs. These may be advantageously separated from the solution at this point, preferably at a temperature between about 40 and about 85° C. Following the crystallization and separation of salts from the glutamic acid liquor, the pH of the resulting solution was adjusted to about 3.2 by addition by hydrochloric acid. The resulting liquor was permitted to stand at room temperature for several days in order to permit crystallization of glutamic acid therefrom. The glutamic acid crystals were isolated by means of filtration or centrifugation, and were preferably washed with about 40 to 150% by weight of water, resulting in a glutamic acid of 85% purity or higher.

The glutamic acid crystals produced by this process contain between about 75 and about 100 color units when compared to an arbitrary color scale set up for the purpose of indicating the beneficial effects of alkali lignin upon glutamic acid which is produced by the alkaline hydrolysis of Steffen's filtrate. The end liquor so produced by filtration of glutamic acid crystals contains between about 9 and about 20 color units.

The color scale referred to above is an arbitrary measurement of the percent transmission of white light through a standard solution of glutamic acid or glutamic acid end liquor, water being the primary standard with 100% transmission expressed as zero color units. Measurements were made on a Cenco Shear Photolometer or other suitable colorimeter.

*Example II*

A process similar to that described in Example I was carried out, but about 30 ml. of a 10% alkali lignin solution, prepared by dissolving about 100 parts of alkali lignin in 900 parts of 5% NaOH solution, was added to the Steffen's filtrate prior to hydrolysis. Following the hydrolysis step, the hydrolysate was adjusted to a pH between about 5.5 and about 6.0 with hydrochloric acid. After standing for about one hour, the resulting mixture was filtered through a duck fabric filter coated with filter aid. The filtration of the precipitated impurities, followed by sequential crystallization of inorganic salts and then glutamic acid, was accomplished as described in Example I. The yield of glutamic acid was about equal to that produced in Example I, and the purity of the product was about 89.5%, the glutamic acid product containing about 16 to 21 color units. This constitutes a substantial reduction in the amount of color present in the product as compared with the product produced in accordance with the process described in Example I.

*Example III*

An alkaline hylrolysis of Steffen's filtrate was carried out as described in Example I, and the alkaline hydrolysate was adjusted to a pH of about 5.4 with hydrochloric acid. To the adjusted hydrolysate was added a 10% solution of alkali lignin, said solution having a pH between about 9.0 and about 11.0. About 0.6 gram of alkali lignin (solids basis) per 100 grams of Steffen's filtrate is sufficient to condition the colored colloidal impurities and effect an improved precipitation and removal of said impurities from the hydrosylate. The alkali lignin-treated hydrosylate was permitted to stand at room temperature for about 45 minutes and was then filtered as described in Example II. The filtrate was next concentrated, at a temperature of about 65° C., to about 90% of the weight of the original Steffen's filtrate, and the resulting solution was filtered in order to remove the inorganic salts which crystallized at this particular point of the process. The resultant solution was acidified with hydrochloric acid (37% HCl) to give the filtrate a pH of about 3.2. After about 5 days, the glutamic acid which crystallized from the solution was recovered therefrom by filtration, washed with about an equal weight of water, and dried.

The yield of glutamic acid produced by this process is about 65% of the theoretical, and the product has a purity of about 92%. The color of the glutamic acid produced in accordance with this process is about 6 color units on the arbitrary scale set up for comparison purposes.

This modification of the instant novel process illustrates the marked improvement in color of glutamic acid produced in accordance with the instant novel process in comparison with that obtained in accordance with standard procedures such as described in Example I, and further illustrates the marked improvement in color brought about by conditioning colored colloidal impurities present in alkali-hydrolyzed Steffen's filtrate and removing these impurities in the presence of alkali lignin.

*Example IV*

A one kilogram sample of alkali-hydrolyzed Steffen's filtrate, prepared in accordance with the process as outlined in Example I, was admixed with about 60 ml. of a 10% solution of alkali lignin similar to that employed in Example II. The resulting mixture was adjusted to a pH of about 5.4 with concentrated hydrochloric acid (37% HCl). The impurities which precipitated were removed as described in the previous examples; and the removal of inorganic salts and recovery of glutamic acid crystals was essentially the same as that described in the previous examples. The resulting glutamic acid product has about 24 color units when compared to the arbitrary scale set up for comparison purposes. The yield of glutamic acid was equal to that obtained in Examples I and II, and the purity of the product was about 90%.

The examples recited above illustrate the use of hydrochloric acid for the various pH adjustments, but it is to be understood that other acidic reagents such as those previously mentioned herein, including acid-hydrolyzed Steffen's filtrate, may be employed in these particular steps.

Obviously the invention is not limited to the procedural details herein stated, but may be carried out by employing equivalent and obvious extensions and modifications of the factors recited.

Having thus fully described the nature and character of the invention, what is desired to be secured by Letters Patent is:

1. A process which comprises adding a small amount of alkali lignin to a glutamic acid-containing aqueous solution, the glutamic acid having been produced by the alkaline hydrolysis of Steffen's filtrate and containing organic impurities inherent to the hydrolysis process, separating the resulting precipitate and recovering glutamic acid from the resulting solution.

2. A process which comprises adding a small amount of alkali lignin to a glutamic acid-containing aqueous solution, the glutamic acid having been produced by the alkaline hydrolysis of Steffen's filtrate and containing organic impurities inherent to the hydrolysis process, adjusting the pH of said solution to below about 7.0, separating the resulting precipitate from the solution and recovering glutamic acid from the resulting solution.

3. A process which comprises adding a small amount of alkali lignin to a glutamic acid-containing aqueous solution, the glutamic acid having been produced by the alkaline hydrolysis of Steffen's filtrate and containing organic impurities inherent to the hydrolysis process, adjusting the pH of said solution to between about 5.0 and about 7.0, separating the resulting precipitate and recovering glutamic acid from the resulting solution.

4. In a process for producing glutamic acid by an alkaline hydrolysis of Steffen's filtrate, the improvements comprising conducting the hydrolysis in the presence of a small amount of alkali lignin, separating the precipitate from the hydrolysate, and recovering glutamic acid from the resulting solution.

5. A process which comprises hydrolyzing Steffen's filtrate under alkaline conditions and in the presence of a small amount of alkali lignin, adjusting the pH of the hydrolysate to between about 5.0 and about 7.0 with an acidic material which is non-oxidizing under the conditions obtaining, separating the resulting precipitate and recovering glutamic acid from the resulting solution.

6. In a process for producing glutamic acid by an alkaline hydrolysis of Steffen's filtrate, the improvements comprising adding a small amount of alkali lignin to the hydrolysate, separating the resulting precipitate therefrom, and recovering glutamic acid from the resulting solution.

7. A process which comprises adding a small amount of alkali lignin to the alkaline hydrolysate of Steffen's filtrate, adjusting the pH of the mixture to between about 5.0 and about 7.0 with an acidic material which is non-oxidizing under the conditions obtaining, separating the resulting precipitate and recovering glutamic acid from the resulting solution.

8. In a process for producing glutamic acid by an alkaline hydrolysis of Steffen's filtrate, the improvements comprising adjusting the pH of the hydrolysate to between about 5.0 and about 7.0 with acidic material which is non-oxidizing under the conditions obtaining, adding a small amount of alkali lignin to the resulting solution, separating the resulting precipitate therefrom, and recovering glutamic acid from the resulting solution.

9. A process which comprises hydrolyzing Steffen's filtrate with a basic inorganic oxygen-containing compound in an amount not greater than about 10% by weight of Steffen's filtrate at a temperature not greater than about 90° C., adjusting the pH of the hydrolysate to between about 5.0 and about 7.0 with an acidic material which is non-oxidizing under the conditions obtaining, adding to the resulting mixture a small amount of a solution comprising essentially alkali lignin dissolved in caustic soda, allowinng precipitation of impurities to occur at a temperature not greater than about 75° C., separating the precipitate from the solution, evaporating the resulting solution at least to the point of incipient crystallization of salts, crystallizing and separating said salts therefrom, adjusting the pH of the resulting solution to about 3.2, and crystallizing and separating glutamic acid from the adjusted solution.

10. A process which comprises separately preparing an alkaline hydrolysate of Steffen's filtrate and an acid hydrolysate of Steffen's filtrate, combining the hydrolysates while avoiding conditions conducive to the precipitation of substantial amounts of glutamic acid, adding a small amount of alkali lignin to the combined hydrolysates, separating the resulting precipitate therefrom, and recovering glutamic acid from the resulting liquid.

11. A process which comprises separately preparing an alkaline hydrolysate of Steffen's filtrate and an acid hydrolysate of Steffen's filtrate, combining the hydrolysates to give a mixture having a pH between about 5.0 and about 7.0, adding a small amount of alkali lignin thereto, separating the resulting precipitate from the solution, adjusting the pH of the resulting solution to about 3.2, and recovering glutamic acid therefrom.

12. A process of removing organic impurities present in crude glutamic acid produced by the alkaline hydrolysis of Steffen's filtrate which comprises adding a small amount of alkali lignin to a solution of said glutamic acid, separating the resulting precipitate and recovering glutamic acid in the resulting solution.

13. A process of removing organic impurities present in crude glutamic acid produced by the alkaline hydrolysis of Steffen's filtrate, which comprises adding a small amount of alkali lignin to an aqueous solution of said glutamic acid prepared by dissolving the said glutamic acid in an aqueous solution containing at least one inorganic basic oxygen-containing compound in a sufficient amount to give the resulting solution a pH between about 5.0 and about 7.0, separating the resulting precipitate, adjusting the pH of the resulting solution to about 3.2 and recovering glutamic acid therefrom.

MORRIS J. BLISH.

REFERENCES CITED

The following references are of record in the file of this patent:

UNITED STATES PATENTS

| Number | Name | Date |
|---|---|---|
| 1,940,428 | Masuda | Dec. 19, 1933 |
| 2,180,637 | Kemmererr | Nov. 21, 1939 |
| 2,373,342 | Royal | Apr. 10, 1945 |
| 2,449,209 | Farber et al. | Sept. 14, 1948 |

Certificate of Correction

Patent No. 2,487,785 November 15, 1949

MORRIS J. BLISH

It is hereby certified that errors appear in the printed specification of the above numbered patent requiring correction as follows:

Column 2, line 50, for "preferance" read *preference*; column 5, line 32, for the word "later" read *latter*; column 6, line 37, for "condiitons" read *conditions*; column 8, line 3, for "about 24 hours" read *about 1/4 and about 24 hours*; lines 7 and 8, for "contrifugation" read *centrifugation*; column 9, line 46, for "preciptation" read *precipitation*; column 11, line 16, for "addition by" read *addition of*; column 14, line 6, for "allowinng" read *allowing*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*